United States Patent [19]

Kato et al.

[11] Patent Number: 4,992,328

[45] Date of Patent: Feb. 12, 1991

[54] MAGNETIC RECORDING MEDIUM

[75] Inventors: Mikihiko Kato; Yasushi Endo; Toshio Kawamata, all of Kanagawa, Japan

[73] Assignee: Fuji Photo Film Co., Ltd., Kanagawa, Japan

[21] Appl. No.: 253,636

[22] Filed: Oct. 6, 1988

[30] Foreign Application Priority Data

Oct. 7, 1987 [JP] Japan .................................. 62-251452
Oct. 7, 1987 [JP] Japan .................................. 62-251453

[51] Int. Cl.$^5$ ............................................. G11B 23/00
[52] U.S. Cl. ...................................... 428/323; 427/44;
427/128; 428/329; 428/694; 428/900
[58] Field of Search ..................... 428/329, 694, 900;
427/128, 44

[56] References Cited

U.S. PATENT DOCUMENTS

| | | | |
|---|---|---|---|
| 4,552,808 | 11/1985 | Fujiyama | 428/328 |
| 4,654,260 | 3/1987 | Chubachi et al. | 428/900 |
| 4,666,770 | 5/1987 | Asai et al. | 428/900 |
| 4,687,703 | 8/1987 | Miyashi et al. | 428/900 |
| 4,689,263 | 8/1987 | Kambe et al. | 428/900 |
| 4,759,966 | 7/1988 | Shimozawa et al. | 428/694 |
| 4,818,606 | 4/1989 | Koyama et al. | 428/694 |
| 4,820,581 | 4/1989 | Saito et al. | 428/694 |

FOREIGN PATENT DOCUMENTS 185112A 6/1986 European Pat. Off. .

Primary Examiner—Paul J. Thibodeau
Attorney, Agent, or Firm—Sughrue, Mion, Zinn, Macpeak & Seas

[57] ABSTRACT

A magnetic recording medium is disclosed, comprising a nonmagnetic support having thereon a magnetic layer containing ferromagnetic particles which are dispersed in a binder and have a tabular hexagonal crystal shape with an axis of easy magnetization perpendicular to the plate, wherein said ferromagnetic particles have a specific surface area of from 50 to less than 70 m$^2$/g, and further said magnetic layer contains abrasive agents having a Mohs' hardness of 6 or more and having an average particle diameter of from 0.3 to 1.0 μm in an amount of from 7 to 15 parts by weight per 100 parts by weight of the ferromagnetic particles.

14 Claims, 2 Drawing Sheets

MAGNETIC RECORDING MEDIUM

FIELD OF THE INVENTION

This invention relates to a magnetic recording medium, and more particularly it relates to a magnetic recording medium having improved output and running durability and having a magnetic layer containing ferromagnetic particles which are dispersed in a binder and have a tabular hexazonal crystal shape with an axis of easy magnetization perpendicular to the plate.

The magnetic recording medium of this invention is suitable as, for example, a magnetic tape, a magnetic disk, a magnetic card and a floppy disk.

BACKGROUND OF THE INVENTION

A magnetic recording medium comprising a non-magnetic support having thereon a magnetic layer containing acicular crystalline ferromagnetic particles such as $\alpha$-$Fe_2O_3$ or $CrO_2$ in a binder is conventionally used. Recently, there has been a demand for a magnetic recording medium with minimal size but with increased capacity for recording information. In this field, therefore, improvements with respect to higher density recording of a magnetic recording medium have become an important subject. In this connection, the maximum dimension of acicular particles must be far smaller than the recording wavelength or recording bit length in order to obtain a magnetic recording medium which uses conventional acicular ferromagnetic particles but which is also suitable for higher density recording. Currently, improvements have produced acicular ferromagnetic particles having a particle diameter of about 0.3 $\mu$m, and the shortest recording wavelength achieved has been about 1 $\mu$m. Yet, the dimension of acicular ferromagnetic particle should be even smaller, if a magnetic recording medium suitable for much higher density recording is needed. However, in such acicular magnetic particles having such a small size, the width thereof is so narrow, that is, 100 Å or less, and the volume thereof is so small, that is, $1 \times 10^{-17}$ cm$^3$ or lower, that there is also a problem that, as a result of heat disturbance and effect of surface (i.e., the effect in that the magnetic characteristics in surface portions of a magnetic medium are reduced because the spin of atoms which is present at vicinity of surface of the magnetic medium becomes unstable), magnetic characteristics decrease and magnetic orientation can not be successfully carried out.

To solve the above problem, a magnetic recording medium using ferromagnetic particles of tabular hexagonal crystal ferrite having an axis of easy magnetization perpendicular to the plate has recently been developed, as disclosed in JP-A-58-6525 and JP-A-58-6526. (The term "JP-A-" as used herein means an "unexamined published Japanese patent application"). Those ferromagnetic particles have made it possible to achieve an average particle size of 0.05 $\mu$m or less and thus high density recording has become possible using those ferromagnetic particles.

Thus, ferromagnetic particles can be granulated more finely, and the packing density thereof can be increased by the use of such hexagonal crystal ferrite ferromagnetic particles, whereby output and C/N (carrier/noise ratio) of the magnetic recording medium can be improved.

However, deposite this achievement, it has become extremely difficult to maintain the durability of a magnetic layer, as the granulation of particle size of ferromagnetic particles proceeds. There have been proposed many approaches to avoid the above problem. For instance, a magnetic layer is made tough and noise is decreased by using isophorone type hardening agents (as described in JP-A-60-55516), S/N is improved by determining the active hydrogen equivalent in a binder (as described in JP-A-60-70518), the dispersibility of each component in a magnetic layer is improved by mixing CBA (cellulose butylacetate), polyurethane resins and NBR (nitrile-butadiene rubber) in combination (as described in JP-A-60-193127), abrasive agents are added under predetermined conditions (as described in JP-A-61-94222), reproduced output is improved by adding graphited carbon (as described in JP-A-61-139926), the durability of the magnetic layer is improved by emulsifying a binder (as described in JP-A-61-210517), the durability of a magnetic layer is imporved by decreasing $\mu$ value (friction coefficient) of graphite to be added (as described in JP-A-61-214128), efficiencies of manufacturing steps are improved by using radiation sensitive binders (as described in JP-A-61-233414), particle sizes of abrasive agents are reduced (as described in JP-61-A-273735), a binder is used in an amount of from 10 to 30 wt % (as described in JP-A-61-289522), and the specific surface area of magnetic particles is defined to be from 70 to 120 m$^2$/g (as described in JP-A-62-38531). But the above approaches are not yet satisfactory, because good results could not be obtained in the thermocycle durability test of a floppy disk (i.e., continuous running durability test under the recycle of conditions at a high temperature of 60° C. and a low temperature of 5° C. each for 24 hours.).

SUMMARY OF THE INVENTION

An object of this invention is to provide a magnetic recording medium having improved output of a magnetic layer and remarkably improved running durability.

In view of the above-mentioned problems with the conventional technologies, the present inventors have performed a thorough investigation of magnetic recording media using extremely finely granulated hexagonal crystal ferrite. The inventors have found that the above-stated object can be achieved by using in combination with (A) tabular hexagonal crystal ferromagnetic particles having a predetermined specific surface area and (B) abrasive agents in a predetermined amount.

That is, this invention relates to a magnetic recording medium comprising a non-magnetic support having thereon a magnetic layer containing ferromagnetic particles which are dispersed in a binder and have a tabular hexagonal crystal shape with an axis of easy magnetization perpendicular to the plate, wherein said ferromagnetic particles have a specific surface area of from 50 to less than 70 m$^2$/g, and further said magnetic layer contains abrasive agents having a Mohs' hardness of 6 or more and having an average particle diameter of from 0.3 to 1.0 $\mu$m in an amount of from 7 to 15 wt % based on ferromagnetic particles.

BRIEF DESCRIPTION OF DRAWINGS

FIGS. I-1 and II-1 are graphs showing the relationship between the specific surface area (unit: m$^2$/g) and durability (unit: x10$^4$ passes) and 2F output (unit: %) of each sample obtained in Examples and Comparative Examples of this invention.

DETAILED DESCRIPTION OF THE INVENTION

Figure 1:
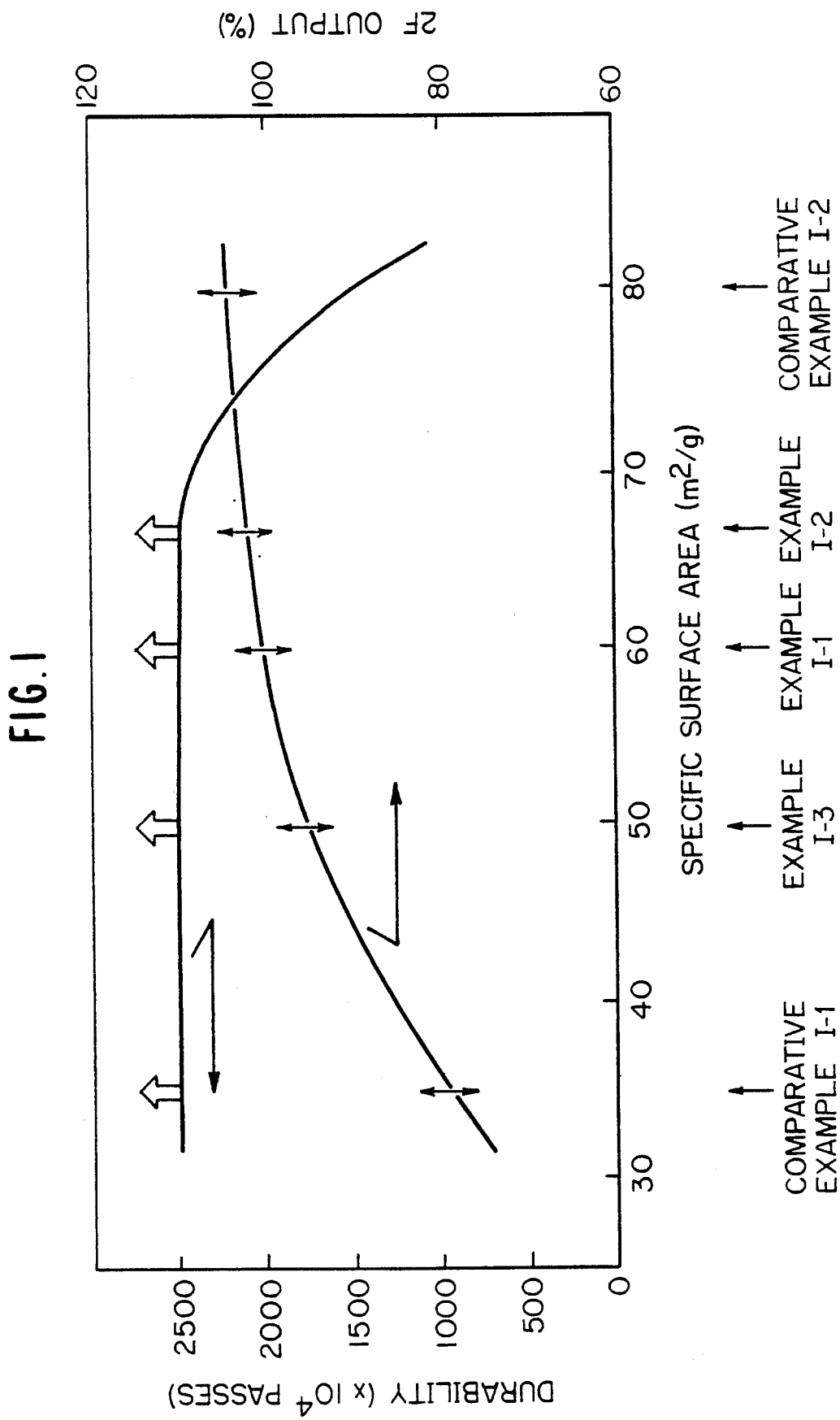
Figure 2:
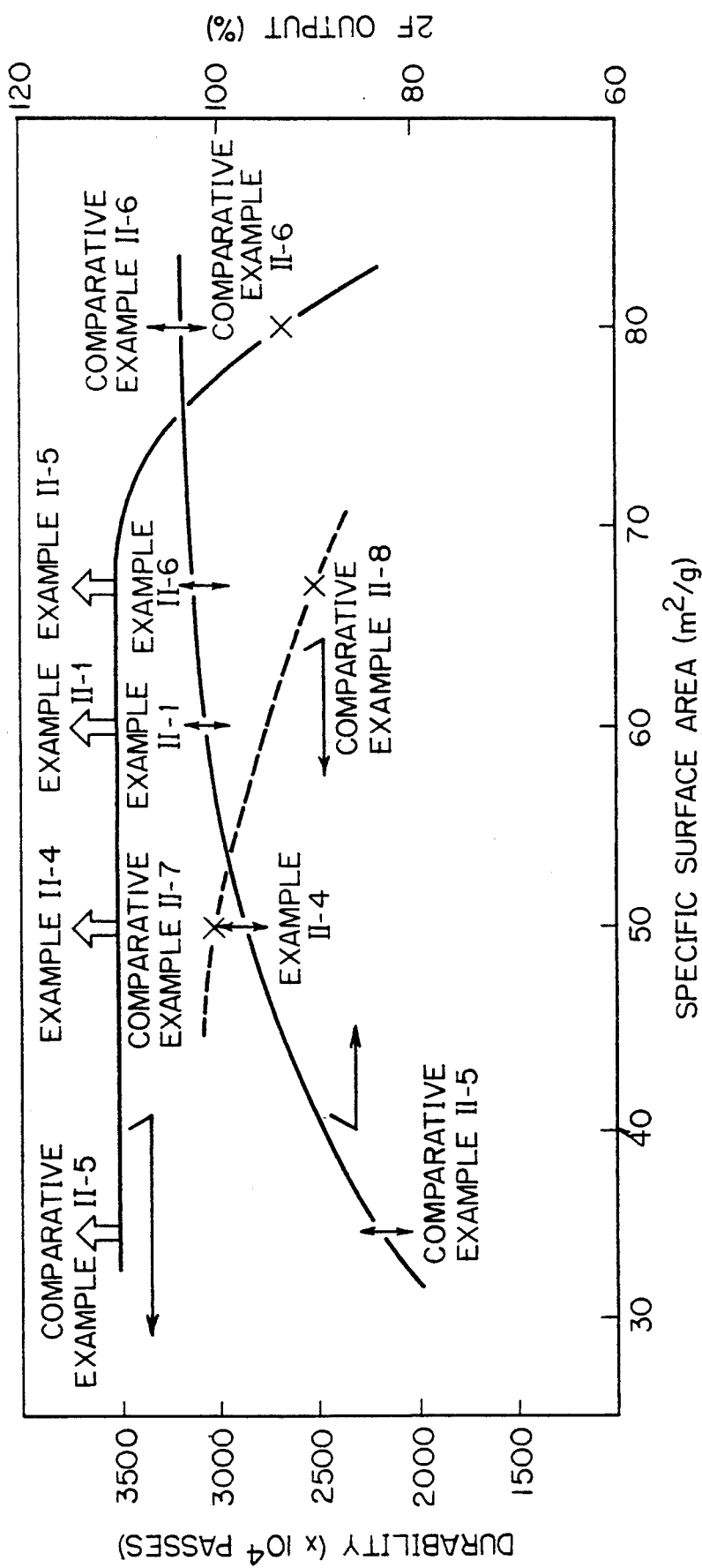

Particularly, this invention is to obtain above-described magnetic recording medium wherein a surface roughness (Ra) value of said magnetic layer shown by center line average roughness (in cut off value of 0.25 mm) is preferably from 0.01 to 0.03 μm. And still more preferably, this invention is to obtain the above-described magnetic recording medium wherein a compound which is polymerized with electron beam radiation is contained as one component in the binder.

The non-magnetic support used in this invention includes polyesters such as polyethylene terephthalate or polyethylene-2,6-naphthalate; polyolefin resins such as polypropylene; cellulose derivatives such as cellulose triacetate or cellulose diacetate; vinyl type resins such as polyvinyl chloride; various plastics such as polycarbonate resins, polyamide resins, polyimide resins, polyamidoimide resins, polysulfon resins or polyether sulfone resins; film shape plastics and plate shape plastic composed of plastics thereof; metal materials such as aluminum, stainless steel or zinc; plate-like ceramics such as glass, or china; and composites of the above materials. The shape of the supports may be formed beforehand, or after a magnetic layer and a backing layer are formed, they may be cut to a desired shape. Those supports may be subjected to pre-treatment such as corona discharge treatment, plasma treatment, undercoat treatment, heat treatment, metal vapour deposition treatment or alkaline treatment, as disclosed in West German Patent 3,338,854A, JP-A-59-116926, U.S. Pat. No. 4,388,368 and Yukio Mitsuishi, "Seni to Kogyo" (Fibers and Industry) vol 31, pp. 50–55 (1975).

In an illustrative embodiment, a magnetic layer to be provided on the support is fundamentally composed of ferromagnetic particles having (A) a tabular hexagonal crystal shape with an axis of easy magnetization perpendicular to the plate, (B) abrasive agents having a Mohs' hardness of 6 or more and having an average particle size of from 0.3 to 1.0 μm, and (C) a binder for binding the above to form a layer. However, the present invention is not to be construed as being limited thereto.

The ferromagnetic particles of this invention are ferromagnetic particles which have a tabular hexagonal crystal shape with an axis of easy magnetization perpendicular to the plate, such as, for example, hexagonal crystal shape ferrite particles (e.g., barium ferrite, strontium ferrite, lead ferrite, calcium ferrite and the cobalt-substituted particles thereof, and among these, cobalt substituted barium ferrite and cobalt substituted strontium ferrite are particularly preferred.). The tabular hexagonal crystal ferromagnetic particles generally have a average tabular diameter (average particle diameter) of from about 0.01 to 0.10 μm and preferably from about 0.04 to 0.07 μm; a average tabular thickness (average thickness) of from about 0.005 to 0.5 μm and preferably from about 0.006 to 0.01 μm; and a tabular ratio (tabular diameter/tabular thickness) of 2 or more and preferably from 2 to 6. In this invention, the specific surface area is from 50 to less than 70 m$^2$/g and preferably from 55 to 65 m$^2$/g. When the specific surface area is less than 50 m$^2$/g, sufficiently improved output in the magnetic layer cannot be expected, and when the specific surface area exceeds 70 m$^2$/g, ferromagnetic particles can be dispersed with difficulty, and the durability of the magnetic layer cannot be improved satisfactorily.

The following methods: conventional coprecipitation—heat treatment reaction, water and heat synthesis, fuse and melt salt method and glass crystallization, can be used for preparing tabular hexagonal crystal ferromagnetic particles. For example, the hexagonal system tabular particle which can be used in this invention can also be prepared according to Kiyama. M., *Bull. Chem Soc. Japan*, 49, 1855 (1976), and H. Hibst, *Angew. Chem. Int. Ed. Engl.*, 21, 270–282 (1982). The specific surface area of ferromagnetic particles can be measured by the BET method. The specific surface area can be measured, for example, by the BET one point method (partial pressure 0.30) (as described in Byck, H. T. Fidiam, J. F., A. Spell Paper, No. 49, Div. of Colloid Chem., Am. Chem Soc. Meating, Chicago I-11 (Sept. 12, 1946)), after ferromagnetic particles are dehydrated in a nitrogen gas atmosphere at 250° C. for 30 mins. using "QUANTERSORB" manufactured by QUANTARCHROME Co., Ltd.

The abrasive agents are agents having a Mohs' hardness of 6 or more, and an average particle size of from 0.3 to 1.0 μm, such as, for example, fused alumina, silicon carbide, chromium oxide, corundum, artificial corundum, diamond, artificial diamond, garnet, emery (main components: corundum-magnetite). Preferred abrasive agents are chromium oxide and alumina. These abrasive agents have a Mohs' hardness of 6 or more and preferably from 7 to 11, and an average particle diameter of from 0.3 to 1.0 μm and preferably from 0.4 to 0.8 μm. These abrasive agents are used in an amount of from 7 to 15 parts by weight and preferably from 8 to 12 parts by weight, per 100 parts by weight of the ferromagnetic particles. When the abrasive agent is used in less amount thereof, sufficient durability cannot be obtained. When the abrasive agent is used over the above range, the packing density decreases, and sufficient output cannot be obtained. The dispersing agents, lubricating agents and antistatic agents which will be illustrated hereinafter may be impregnated in a solvent and adsorbed on the surface of ferromagnetic particles before dispersing step.

The binders for binding the component to form a magnetic layer include conventionally known thermoplastic resins, thermosetting resins, reactive type resins, and the mixture thereof, and preferably include compounds polymerized with electron beam radiation.

The thermoplastic resins include those resins having a softening point of 150° C. or lower, an average molecular weight of from about 10,000 to about 300,000, and a degree of polymerization of from about 50 to 2,000, such as a copolymer of vinyl chloride and vinyl acetate, copolymer of vinyl chloride and vinylidene chloride, copolymer of vinyl chloride and acrylonitrile, copolymer of acrylate and acrylonitrile, copolymer of acrylate and vinylidene chloride, copolymer of acrylate and styrene, copolymer of methacrylate and acrylonitrile, copolymer of methacrylate and vinylidene chloride, copolymer of methacrylate and styrene, copolymer of vinylidene chloride and acrylonitrile, copolymer of butadiene and acrylonitrile, copolymer of styrene and butadiene, polyamide resins, polyvinyl butyral resins, cellulose derivatives (cellulose acetate, butyrate, cellulose diacetate, cellulose triacetate, cellulose propionate, nitrocellulose), urethane elastomer, copolymer of nylon and silicon, nitrocellulose/polyamide resins, polyvinyl fluoride resins, polyester resins, copolymer of chlorovinyl ether and acrylate, amino resins, various synthetic rubber type thermoplastic resins and the mixture thereof.

The thermosetting resins or reactive type resins include those resins having a molecular weight of 200,000 or lower when the resins are in the coating composition and the molecular weight thereof becomes infinite by the reaction of condensation and adduction when those resins are coated, dried and heated. Preferred resins are those that neither soften nor melt until those resins are heat-decomposed. Specific examples of those resins include phenol resins, epoxy resins, polyurethane resins, urea resins, melamine resins, alkyd resins, silicon resins, acryle type reactive resins, epoxy and polyamide resins, nitrocellulose-melamine resins, mixture of high molecular weight polyester resins and isocyanate prepolymer, mixtures of copolymer of methacrylic acid salt and diisocyanate, urea and formaldehyde resins, mixtures of (1) a low molecular weight glycol (2) a high molecular weight diol and (3) triphenylmeathane triisocyanate, and polyamine resins. Mixtures of any of the above-mentioned resins are also possible.

Those thermoplastic resins, thermosetting resins and reactive type resins include, as functional groups in addition to the main functional groups, acid groups such as carboxylic acid groups, sulfinic acid groups, sulfonic acid groups, phosphoric acid groups, sulfate groups or phosphate groups; amphoteric groups such as amino acids, aminosulfonic acids, sulfates and phosphates of aminoalcohol or alkylbetaine type groups; amino groups, imino groups, imide groups, amide groups, hydroxyl groups, alkoxyl groups, thiol groups, halogen groups, silyl groups and siloxane groups. Generally, from one to six kinds of these groups are included, and each functional group is preferably included in an amount of $1 \times 10^{-6}$ eq. to $1 \times 10^{-2}$ eq. and particularly preferably from $1 \times 10^{-5}$ to $1 \times 10^{-3}$ eq., per 1 g of the resin.

The above synthetic resins are used alone or in combination as a binder of this invention. In the magnetic layer, the mixing ratio of ferromagnetic particles and binders is generally from 5 to 300 parts by weight and preferably from 100 to 200 parts by weight of binders, per 100 parts by weight of the ferromagnetic particles.

Further, polyisocyanate type hardening agents are desirably used in combination with the above binders. The hardening agents include various type isocyanates such as tolylene diisocyanate, 4,4'-diphenylmethane diisocyanate, hexamethylene diisocyanate, xylylene diisocyanate, naphthylene-1,5-o-toluidine diisocyanate, isophorone diisocyanate or triphenylmethane triisocyanate; reaction products of these isocyanates and polyalcohol; and polyisocyanates produced by the condensation of isocyanates. These polyisocyanates are polyfunctional isocyanates and urethane prepolymers having isocyanates groups at both terminals and are commercially available in the trade name of "Collonate L", "Collonate HL", "Collonate 2030", "Collonate 2031", "Millionate MR" and "Millionate MTL", (manufactured by Nippon Polyurethane Industries Co., Ltd.); "Takenate D-102", "Takenate D-110N", "Takenate D-200" and "Takenate D-202",(manufactured by Takeda chemical Industries, Ltd.); "Desmodule L", "Desmodule IL", "Desmodule N" and "Desmodule HL", (manufactured by Sumitomo Bayer Co., Ltd.). These isocyanates may be used alone, or in combination of at least two kinds by taking advantage of the differences with respect to the hardening reactivity of each. It is desirable that those compounds are polyfunctional.

Further, compounds having hydroxyl groups, amino groups and the like may be used in combination to accelerate the hardening reaction. These hardening agents are generally used in an amount of from 5 to 40 parts by weight per 100 parts by weight of a binder.

These hardening compounds may be used in combination with various thermoplastic resins, thermosetting resins and reactive type resins which are components of binders.

Compounds polymerized with electron beams radiation may be included as a component of a binder. Such compounds are compounds having at least one carbon-carbon unsaturated bond, and are compounds having acryloyle group, methacryloyl group, acrylamide groups, allyl groups, vinylether groups or vinylthioether group, and unsaturated polyesters. The specific examples include unsaturated fatty acids such as acrylic acid or 2-butenic acid; unsaturated polybasic acids such as maleic acid, fumaric acid, 2-butene-1,4-dicarboxylic acid or muconic acid; unsaturated fatty acid amides such as acrylic acid amide, crotoron acid amide, 2-pentenoic acid amide or maleic acid amide; methyl acrylate and the homologue of alkylacrylate; styrene and the homologue of α-methylstyrene, and β-chlorostyrene; acrylonitrile; vinyl acetate; and vinyl propionate. Two or more unsaturated bonds may be included in a molecule. Specific examples of such compounds are disclosed in "Data Collection of light-sensitive resins", edited by Sogo Kagaku Kenkyusho, pp. 235-236, published in December 1968. Particularly, polyol unsaturated esters such as ethylene diacrylate, diethylene glycol diacrylate, glycerool triacrylate or pentaerythritol tetraacrylate and glycidyl acrylate having epoxy groups are preferred. Compounds having one unsaturated bond and these having two or more unsaturated bonds in a molecule may be used in combination.

These compounds may be high molecular weight compounds. Compounds having acrylate groups at the terminal or side chains are particularly preferred. Such compounds are disclosed in a thesis by A. Vrancken in the publication "Fatipec Congress", vol. 11 No. 19 (1972). For example, such compounds are represented by the following formula:

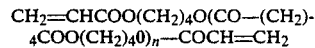

(in the formula, n is a positive integer of from 0 to 500.) The polyester skeleton may be a polyurethane skeleton, an epoxy resin skeleton, a polyether skeleton or polycarbonate skeleton or a mixture or these four. The molecular weight of the polyester skeleton is preferably from 1,000 to 20,000, but is not particularly limited.

The compounds capable of polymerizing with electron beam radiation may be a mixture of the above monomer and polymer. Further, the above compounds may include a polar group. The polar groups may include —COOH group, —OH group, —SO$_3$M group, —OSO$_3$M group, —PO$_3$M$_2$ group and —OPO$_3$M$_2$ group (in each group, M is hydrogen atom, alkali metal atom or ammonium group), and the polar groups preferably include —COOH group and —SO$_3$M group. The content of polar groups is preferably from $1 \times 10^{-7}$ to $1 \times 10^{-3}$ eq., more preferably from $1 \times 10^{-6}$ to $1 \times 10^{-4}$ eq. and most preferably from $1 \times 10^{-5}$ to $5 \times 10^{-5}$ eq.

The ratio of electron beam polymerizable compounds is preferably 3 wt % or more and more preferably 8 wt % or more, per total components for a binder (components for a coating composition for forming a magnetic layer except organic solvents). When the ratio thereof is lower than the above ranges, increase of viscosity of a coating composition and/or gelation thereof due to electron beam radiation are decreased and set of ferromagnetic particles having been orientated is insufficient.

In addition to the above described ferromagnetic particles, binders and abrasive agents, additives such as lubricating agents, dispersing agents, antistatic agents or anti-corresive agents can be added to the coating composition.

The lubricating agents include various silicon oils such as dialkylpolysiloxane, dialkoxypolysiloxane, monoalkylmonoalkoxy polysiloxane, phenylpolysiloxane or fluoroalkylpolysiloxane; saturated or unsaturated higher fatty acids; fatty acid esters; higher fatty acid amides; higher alcohols; inorganic particles such as graphite, molybdenum disulfide, tungsten disulfide; boron nitride or fluorinated graphite; polyethylene, polypropylene, polyethylene and vinyl chloride copolymer; plastic particles such as polytetrafluoroethylene; α-olefin polymer; unsaturated aliphatic hydrocarbon which is liquid at a normal temperature (compound having n-olefin double bond attached to a carbon at the terminal; number of carbon atoms: about 20); fatty acid esters composed of monobasic fatty acid having from 12 to 20 carbon atoms and monovalent alcohol having from 3 to 12 carbon atoms; fluorocarbon; fluorine alcohol; polyolefin; polyglycol; alkylphosphate; polyphenyl ether; fatty acids; fatty acid esters; and aliphatic alcohols. These lubricating agents are generally used in an amount of from 0.2 to 20 parts by weight and preferably from 4 to 16 parts by weight per 100 parts by weight of the ferromagnetic particles.

The dispersing agents include fatty acids having from 10 to 22 carbon atoms such as caprylic acid, capric acid, lauric acid, myristic acid, palmitic acid, stearic acid, oleic acid, elaidic acid, stearolic acid, linolenic acid or linolic acid; alkali metals or alkali earth metals of these fatty acids; soaps of metals such as copper or lead; amides of the above fatty acids; polyalkyleneoxide alkylphosphate; lecithin; trialkylpolyolefinoxyquaternary ammonium salts; higher alcohols; sulfates and phosphates of the above alcohols. These dispersing agents can be used alone or in combination. Further these dispersing agents are generally used in an amount of from 0.5 to 20 parts by weight per 100 parts by weight of the ferromagnetic particles.

The antistatic agents include electroconductive particles such as graphite, carbon black or carbon black graphite polymer; natural surface active agents such as saponin; nonionic surface active agents such as alkylene oxide type agents, glycerine type agents, glycidol type agents, polyhydric alcohol type agents or polyhydric alcohol esters; cationic surface active agents such as higher alkylamine, cyclic amine, hidantoin derivatives, amidoamine, esteramides, quaternary ammonium salts, pyridine, heterocyclic compounds, phosphnium and sulfonium; anionic surface active agents such as carboxylic acid, sulfonic acid, phosphoric acid, and acid groups of sulfate group or phosphate group; and amphoteric surface active agents such as amino acids, aminosulfonic acids, and sulfates or phosphates of aminoalcohols; and alkylbetain type agents. These surface active agents are used alone or in combination. The antistatic agents are generally used in an amount of from 0.2 to 20 parts by weight (as electroconductive particles) and preferably from 0.1 to 10 parts by weight (as surface active agents, per 100 parts by weight of the ferromagnetic particles. The above-described antistatic agents are used not only for the above purposes but also for improving dispersing, magnetic characteristic and lubrication properties, and as a coating aid.

The above-described various additives are added into a coating composition for forming a magnetic layer, or may be coated or sprayed on the surface of a magnetic layer after drying a magnetic layer with or without dissolving in an organic solvent.

As described above, a coating composition for forming a magnetic layer is prepared by selecting the above each component for a binder, dissolving the selected binder in a solvent capable of dissolving the above component, adding ferromagnetic particles in the resulting composition, stirring, and then homogeneously dispersing the particles.

For example, the solvents include ketone type solvents such as acetone, methyl ethyl ketone, methyl isobutyl ketone, cyclohexanone, isophorone or tetrahydrofuran; alcohol type solvents such as methanol, ethanol, propanol, butanol, isobutyl alcohol, isopropyl alcohol or methyl cyclohexanol; esters such as methyl acetate, ethyl acetate, butyl acetate, isobutyl acetate, isopropyl acetate, ethyl lactate, ethyl butyrate, monoethyl ether of glycol acetate or ethylene glycol monoacetate; ethers such as ethers, glycol dimethyl ether, glycol monoethyl ether, tetrahydrifuran or dioxane; aromatic hydrocarbon type solvents such as benzene, toluene, xylene, cresol, chlorobenzene or styrene; halogenated hydrocarbon type solvents such as methylene chloride, ethylene chloride, carbon tetrachloride, chloroform, ethylene chlorohydrin or dichlorobenzene; N,N-dimethylformamide or hexane. These solvents are optionally selected in light of the binder used and at least two kinds of solvents may be used. These organic solvents are selected so that the substances to be dissolved can be completely dissolved. When solvents are mixed solvent, the ratio of each solvent is optionally determined. These solvents should not deteriorate the characteristics of ferromagnetic particles, which are the main component of a magnetic layer. Upon mixing and kneading, ferromagnetic particles and each component described above is simultaneously or one by one introduced into a mixing and kneading device. For example, ferromagnetic particles are added into a solvent which contains dispersing agents, and they are mixed and kneaded for a predetermined period of time to prepare a coating composition.

Upon dissolving and dispersing each component in an organic solvent, various mixing and kneading devices such as a two roll mill, a three roll mill, a ball mill, a pebble mill, a trommel, a sand grinder, Szegvari Attritor, a high speed impeller dispersing machine, a high speed stone mill, a high speed impact mill, a disper, a kneader, a high speed mixer, a ribbon blender, a cokneader, an intensive mixer, a tumbler, a disperser, a homogenizer or an ultrasonic dispersing device can be used. Techniques of mixing, kneading and dispersing are disclosed in T. C. Patton Flow of paints and dispersion of pigments in 1975, and two or more layers may be provided simultaneously by a simultaneous multicoating method.

A coating composition for forming a magnetic layer having been dispersed is coated on a support by various coating methods such as an air doctor coating method, a blade coating method, an air knife coating method, a squeeze coating method, an impregnating method, a reverse roll coating method, a transfer roll coating method, a gravure coating method, a cast coating method, or a spray coating method. The dry thickness of a magnetic layer is generally from about 0.5 to 12 μm and preferably from 1 to 4 μm. When a magnetic layer is a multi-layer, the total thickness should be within the above range. The dry thickness thereof is determined by the shape, usage and standard of the magnetic recording medium.

Technologies for coating a magnetic coating composition for forming a magnetic layer, providing magnetic orientation and drying are conventional ones and can be used in this invention. Particularly in this invention, when surface smoothing treatment is provided with the magnetic recording medium, a magnetic recording medium having excellent surface smoothness and excellent wear resistance can be obtained. The surface smoothing treatment is conducted by smoothing treatment prior to drying or by calendering after drying. As a result thereof, running durability is strikingly improved by adjusting the surface roughness (Ra) of a magnetic layer to generally from 0.01 to 0.03 μm and preferably from 0.012 to 0 02 μm of center line average roughness (in a cut off value of 0.25 mm). When the surface roughness (Ra) is lower than the above range, a magnetic recording medium is likely to stick to a magnetic head and when it is over the above range, output readily decreases undesirably.

The above described technologies for providing orientation, coating, drying and surface smmothing treatment are disclosed in *Coating Engineering* by Yuji Harazaki, published by Asakura Shoten, p.p. 253–277 (Mar. 20, 1971), JP-B-40-23625, JP-B-39-28368, JP-B-41-13181, JP-B-56-26890, and U.S. Pat. No. 3,474,960. (The term "JP-B" as used herein means an "examined Japanese patent publication").

Electron beam radiation treatment for polymerizing compounds which is a characteristic feature of one embodiment of this invention, can be conducted immediately after coating a coating composition to form a magnetic layer or after calendering treatment. The electron beam accelerating methods include the Van de Graph type scanning method. The double scanning method, the curtain beam method and the broad beam curtain beam method. The accelerating method which can be conducted at comparatively low cost and by which high output can be obtained is the curtain beam method. Regarding electron beam characteristics, accelerating voltage is from 100 to 1,000 kV and preferably from 150 to 400 kV, adsorption amount is from 0.5 to 20 Mrad and preferably from 2 to 10 Mrad. When the accelerating voltage is lower than 100 kV, transmission of energy is short, and when it exceeds 1,000 kV, efficiency of energy used for polymerization is low, and is uneconomical. When the adsorption amount is not more than 0.5 M rad, hardening reaction is insufficient, and a thus formed magnetic layer has a low strength. When it exceeds 20 Mrad, efficiency of energy used for the hardening reaction is low, and the radiated object generates heat, and particularly when the support is a synthetic resin, the support undesirably deforms.

When a magnetic recording medium is a magnetic tape having a plastic film as a support, it is desired that a backing layer is provided on the opposite surface of a magnetic layer. A coating composition for a backing layer can be optionally selected from the binders and organic solvents used in a coating composition for a magnetic layer, or from inorganic substance type lubricating agents. The lubricating agents are fine particles having an average particle diameter or preferably 0.8 μm or less, and particularly preferably 0.4 μm or less. The mixing ratio of the binder and the inorganic substance type lubricating agents in a backing layer is generally from 1/0.1 to ¼ and preferably from 1/0.7 to 1/3.0 (weight ratio). Similar to forming a magnetic layer, a coating composition for forming a backing is prepared by uniformly dispersing fine particles of inorganic substances as a lubricating agent in an organic solvent containing binder. Then the thus prepared coating composition is coated on the surface of the support which is opposite to the surface with the magnetic layer. The composition is coated before or after the magnetic layer is formed thereon, and is then dried to form a backing layer. It is desired that the coated thickness of a magnetic recording medium should be as thin as possible to increase recording density per unit of a magnetic recording medium. Therefore, the thickness of a backing layer is preferably from 0.3 to 1.5 μm. Preparation, coating and drying a coating composition for a backing layer is the same as those of a magnetic layer. The order of provision of a magnetic layer and a backing layer on a support can be optionally selected by those skilled in this art, and in any case, with the teachings of this disclosure those skilled in this art can easily prepare a magnetic recording medium of this invention using a prior technique or using, for example, U.S. Pat. No. 4,135,016.

This invention will be hereinafter illustrated in more detail by the following Examples and Comparative Examples. However, the present invention is not to be construed a being limited to these Examples. The results of evaluating each sample are shown conclusively in the Tables. In each Example and Comparative Example, all parts are by weight.

EXAMPLE I-1

A coating composition for forming a magnetic layer was prepared in the following manner.

Preparation of a Coating Composition for a Magnetic Layer

The following composition was sufficiently mixed and dispersed for 60 min. by a sand grinder.

Composition

| Composition: | |
|---|---|
| Ferromagnetic particles: | 300 parts |
| Co substituted Ba ferrite (specific surface area: 60 m²/g, average particle diameter: 0.04 μm, plate ratio: 4) | |
| Binder: | 30 parts |
| Copolymer of vinyl chloride and vinyl acetate "VMCH", having a molecular weight of 30,000 (a trade name, made by Union Carbide Co., Ltd.) | |
| Lecithin | 1.2 parts |
| Graphite particles (average particle diameter: 30 μm) | 6 parts |
| Abrasive agent: | 30 parts |
| chromium oxide (Mohs' hardness: 8–9, average particle diameter: 0.5 μm) | |
| Methyl ethyl ketone | 36 parts |
| Toluene | 36 parts |

Further, the following composition was added thereto and mixed and dispersed for 60 min. sufficiently.

| | |
|---|---|
| -SO$_3$Na group containing polyester polyurethane (molecular weight: 70,000, polar group:150 erg/10$^6$ g) | 20 parts |
| Methyl ethyl ketone | 250 parts |
| Toluene | 250 parts |

Then, the following composition was added thereto, treated for 30 minutes, and then sufficiently mixed and dispersed.

| | |
|---|---|
| Polyisocyanate "Collonate 3041" (trade name, made by Nippon polyurethane Co., Ltd.) | 25 parts |
| Butyl stearate | 4 parts |
| Oleic acid | 4 parts |
| Toluene | 270 parts |

The thus prepared coating composition for forming a magnetic layer was coated by a gravure roll on a polyethylene terephthalate film which was discharge-treated and having a thickness of 75 μm on both surfaces, provided with magnetic orientation using cobalt magnets, then dried at 60° C. for 60 sec. by passing it through the atmosphere and providing calendering treatment to form a magnetic layer having a thickness of 3 μm. The surface roughness (Ra) of the magnetic layer was 0.02 μm (center line average roughness in a cut off value of 0.25 mm). A floppy disk having 3.5 inches was prepared from the thus prepared magnetic film and was identified as Sample I-1.

EXAMPLE I-2

By repeating the same procedure as in Example I-1, a magnetic layer was formed except that ferromagnetic particles in the composition for forming a magnetic layer used in Example I-1 was changed to the following. The surface roughness (Ra) of the magnetic layer was 0.02 μm.

| |
|---|
| Ferromagnetic particles: Co-substituted Ba ferrite (specific surface area: 67 m$^2$/g, average particle diameter: 0.04 μm, tabular ratio (tabular diameter/tabular thickness): 5) |

A 3.5 inch type floppy disk was prepared from the thus prepared magnetic film, and was named as Sample I-2.

EXAMPLE I-3

By repeating the same procedure as in Example I-1, a magnetic layer was formed except that ferromagnetic particles in the composition for forming a magnetic layer used in Example I-1 was changed to the following. The surface roughness (Ra) of the magnetic layer was 0.02 μm.

| |
|---|
| Ferromagnetic particles: Co substituted Ba ferrite (specific surface area: 50 m$^2$/g, average particle diameter: 0.04 μm, tabular ratio: 3) |

A 3.5 inch type floppy disk was prepared from this magnetic film and was named as Sample I-3.

COMPARATIVE EXAMPLE I-1

By repeating the same procedure as in Example I-1, a magnetic layer was formed except that ferromagnetic particles in the composition for forming a magnetic layer used in Example I-1 was changed to the following. The surface roughness (Ra) of the magnetic layer was 0.02 μm.

| |
|---|
| Ferromagnetic particles: Co substituted Ba ferrite (specific surface area: 35 m$^2$/g, average particle diameter: 0.06 μm, tabular ratio: 3) |

A 3.5 inch type floppy disk was prepared from that magnetic film and was named as Comparative Sample I-1.

COMPARATIVE EXAMPLE I-2

By repeating the same procedure as in Example I-1, a magnetic layer was formed except that ferromagnetic particles in the composition for forming a magnetic layer used in Example I-1 was changed to the following. The surface roughness (Ra) of the magnetic layer was 0.02 μm.

| |
|---|
| Ferromagnetic particles: Co substituted Ba ferrite (specific surface area: 80 m$^2$/g, average particle diameter: 0.06 μm, Tabular ratio: 6) |

A 3.5 inch type floppy disk was prepared from that magnetic film and was named as Comparative Sample I-2.

EXAMPLE I-4

By repeating the same procedure as in Example I-1, a magnetic layer was formed except that the surface roughness (Ra) of the magnetic layer was 0.03 μm.

A 3.5 inch type floppy disk was prepared from this magnetic film and was named as Sample I-4.

EXAMPLE I-5

By repeating the same procedure as in Example I-1, a magnetic layer was formed except that the surface roughness (Ra) of the magnetic layer was 0.01 μm.

A 3.5 inch type floppy disk was prepared from this magnetic film and was named as Sample I-5.

COMPARATIVE EXAMPLE I-3

By repeating the same procedure as in Example I-1, a magnetic layer was formed except that the abrasive agent in the coating composition for forming a magnetic layer used in Example I-1 was changed to as follows. The surface roughness (Ra) of the magnetic layer was 0.01 μm.

| | |
|---|---|
| Abrasive agent: chromium oxide (average particle diameter: 0.05 μm) | 5 parts |

A 3.5 inch type floppy disk was prepared from this magnetic film and was named as Comparative Sample I-3.

COMPARATIVE EXAMPLE I-4

By repeating the same procedure as in Example I-1, a magnetic layer was formed except that the abrasive agent in the coating composition for forming a magnetic layer used in Example I-1 was changed to the following. The surface roughness (Ra) of the magnetic layer was 0.05 μm.

Each sample thus prepared in each of the above Examples and Comparative Examples was mounted on a floppy disk drive "FD-1135-D" (a trade name, made by Nippon Electric Co., Ltd.) and was allowed to stand under the thermocycle condition for 24 hours, between at 5° C. and at 10% RH and at 60° C. and at 30% RH to conduct a running durability test.

The results thereof are shown in Table I-1 and in FIG. I-1.

TABLE I-1

| Examples and Comparative Examples | Sample No. | Surface roughness cut off value: 0.25 mm | Initial 2F output (relative ratio: %) | Running durability (number of passes: × 10,000) Good: number of passes is 25000000 or more |
| --- | --- | --- | --- | --- |
| Example I-1 | Sample I-1 | 0.02 | 100 | 2500 (Good) |
| Example I-2 | Sample I-2 | 0.02 | 98 | 2500 (Good) |
| Example I-3 | Sample I-3 | 0.02 | 105 | 2500 (Good) |
| Example I-4 | Sample I-4 | 0.03 | 98 | 2500 (Good) |
| Example I-5 | Sample I-5 | 0.01 | 105 | 2500 (Good) |
| Comparative Example I-1 | Comparative Sample I-1 | 0.02 | 80 | 2500 (Good) |
| Comparative Example I-2 | Comparative Sample I-2 | 0.02 | 102 | 1500 (wear-out/running stopped.) |
| Comparative Example I-3 | Comparative Sample I-3 | 0.01 | 100 | 150 (wear-out/running stopped.) |
| Comparative Example I-4 | Comparative Sample I-4 | 0.05 | 70 | 2500 (Good) |
| Comparative Example I-5 | Comparative Sample I-5 | 0.01 | 110 | 200 (sticking occurred/running stopped.) |
| Comparative Example I-6 | Comparative Sample I-6 | 0.09 | 60 | 2500 (Good) |

Abrasive agent: chromium oxide
(average particle diameter: 1.5 μm)

A 3.5 inch type floppy disk was prepared from this magnetic film and was named as Comparative Sample I-4.

COMPARATIVE EXAMPLE I-5

By repeating the same procedure as in Example I-1, a magnetic layer was formed except that the abrasive agent in the coating composition for forming a magnetic layer used in Example I-1 and the amount thereof were changed to the following. The surface roughness (Ra) of this magnetic layer was 0.01 μm.

| Abrasive agent: chromium oxide (average particle diameter: 0.5 μm) | 5 parts |
| --- | --- |

A 3.5 inch type floppy disk was prepared from this magnetic film and was named as Comparative Sample I-5.

COMPARATIVE EXAMPLE I-6

By repeating the same procedure as in Example I-1, a magnetic layer was formed except that the abrasive agent in the coating composition for forming a magnetic layer used in Example I-1 and the amount thereof were changed to the following. The surface roughness (Ra) of this magnetic layer was 0.09 μm.

| Abrasive agent: chromium oxide (average particle diameter: 0.5 μm) | 60 parts |
| --- | --- |

A 3.5 inch type floppy disk was prepared from this magnetic film and was named as Comparative Sample I-6.

As is apparent from the results of FIG. I-1 and Table I-1, when ferromagnetic particles have a specific surface area of less than 70 $m^2/g$ (Sample I-1 to I-5), sufficient durability (25,000,000 passes: good) is achieved, and when ferromagnetic particles have a specific surface area of 70 $m^2/g$ or more (Comparative Sample I-2), abrupt deterioration of durability was observed. The reproduced output increases in proportion to a specific surface area, and when the specific surface area is less than 50 $m^2/g$ (Comparative example I-1), the reproduced output is 90% or less. In this invention, each sample having a specific surface area within the range as defined in this invention could assure both durability and reproduced output.

As shown in Table I-1, when an average particle diameter of the abrasive agent is lower than the range as defined in this invention (less than 0.3 μm) (Comparative sample I-3), and the addition amount thereof is reduced (less than 7 wt %) as in Comparative sample I-3, sufficient durability cannot be achieved. On the contrary, when the average particle diameter thereof is larger than that as defined in this invention as in Comparative Sample I-4, and the addition amount thereof is increased as in Comparative sample I-6, surface properties are deteriorated, and sufficient output cannot be obtained.

In accordance with this invention, both excellent durability and reproduced output can be obtained by defining a specific surface area of hexagonal crystal ferrite of ferromagnetic particles as from 50 to less than 70 $m^2/g$, an average particle diameter of an abrasive agent as from 0.3 to 1.0 μm and the addition amount thereof as from 7 to 15 wt %, and both durability and reproduced output can be secured by defining the average roughness as from 0.01 to 0.03 μm. Thus, this invention is an extremely excellent one in this field, because characteristics of a magnetic recording medium can be remarkably improved.

EXAMPLE II-1

A coating composition for forming a magnetic layer was prepared in the following manner.

Preparation of a Coating Composition for a Magnetic Layer

The following composition was put in a ball mill and sufficiently mixed and dispersed for about 50 hours.

Composition

| Composition | |
|---|---|
| Ferromagnetic particles:<br>Co substituted Ba ferrite<br>(specific surface area: 60 m$^2$/g,<br>average particle diameter: 0.04 μm,<br>tabular ratio: 4) | 300 parts |
| Binder:<br>copolymer of vinyl chloride and<br>vinyl acetate "VMCH" (a trade<br>name, made by Union Carbide Co., Ltd.,<br>Molecular weight: 30,000) | 40 parts |
| Electron beam polymerizable compound:<br>Polyester type urethane acrylate oligomer<br>(acid value: 10, molecular weight: 10,000,<br>average content of acryloyl group: 3/<br>molecule) | 30 parts |
| Stearic acid | 3 parts |
| Butyl stearate | 6 parts |
| Abrasive agent:<br>chromium oxide (Mohs' hardness: 8-9,<br>average particle diameter: 0.5 μm) | 30 parts |
| Carbon black (average particle diameter: 30 μm) | 6 parts |
| Methyl ethyl ketone | 300 parts |
| Toluene | 300 parts |

The thus prepared coating composition for forming a magnetic layer was coated by a doctor blade coating method on a discharge treated polyethylene terephthalate film having a thickness of 75 μm, provided with magnetic orientation using cobalt magnets, then dried at 60° C. for 60 sec. by passing through the atmosphere and providing calendering treatment to form a magnetic layer having a thickness of 3 μm.

Then, an electron beam was exposed at an accelerating voltage of 165 kV, beam current, 6 mA so that the adsorption amount was 7 M rads. A 3.5 inch type floppy disk was prepared from that magnetic film and was named as Sample II-1.

EXAMPLE II-2

By repeating the same procedure as in Example II-1, a magnetic layer was formed except that the abrasive agent in the coating composition for forming a magnetic layer used in Example II-1 was changed to the following.

| Abrasive agnet: alumina<br>(average particle diameter: 0.4 μm) |
|---|

A 3.5 inch type floppy disk was prepared from that magnetic film and was identified as Sample II-2.

EXAMPLE II-3

By repeating the same procedure as in Example II-1, a magnetic layer was formed except that the binder in the composition for forming a magnetic layer was changed to the following binder.

| Binder:<br>Vinyl chloride copolymer type acrylate<br>(acid value: 13, molecular weight:<br>20,000, average content of acryloyl<br>group: 2.8/molecule) | 40 parts |
|---|---|
| Urethane acrylate<br>(acid value: 10, molecular weight:<br>10,000, average content of acryloyl<br>group: 3/molecule) | 30 parts |

A 3.5 inch type floppy disk was prepared from that magnetic film and was identified as Sample II-3.

EXAMPLE II-4

By following the same procedure as in Example II-1, a magnetic layer was formed except that ferromagnetic particles in the composition for forming a magnetic layer was changed to the following.

| Ferromagnetic particles: Co substituted<br>Ba ferrite (specific surface area: 50 m$^2$/g,<br>average particle diameter: 0.04 μm,<br>tabular ratio: 3) |
|---|

A 3.5 inch type floppy disk was prepared from the magnetic film and was identified as Sample II-4.

EXAMPLE II-5

By following the same procedure as in Example II-1, a magnetic layer was formed except that ferromagnetic particles in the composition for forming a magnetic layer was changed to the following.

| Ferromagnetic particles: Co substituted<br>Ba ferrite (specific surface area: 67 m$^2$/g,<br>average particle diameter: 0.04 μm,<br>tabular ratio: 5) |
|---|

A 3.5 inch type floppy disk was prepared from the magnetic film and was identified as Sample II-5.

COMPARATIVE EXAMPLES II-1 to II-4

By following the same procedure as in Example II-1, magnetic layers were formed except that abrasive agents in the composition for forming a magnetic layer used in Example II-1 and the amounts thereof were changed to the following.

| Abrasive agents: | |
|---|---|
| Comparative Example II-1: chromium oxide (average particle diameter: 0.05 μm) | 5 parts |
| Comparative Example II-2: chromium oxide (average particle diameter: 1.5 μm) | 5 parts |
| Comparative Example II-3: chromium oxide (average particle diameter: 0.5 μm) | 5 parts |
| Comparative Example II-4: chromium oxide (average particle diameter: 0.5 μm) | 60 parts |

3.5 inch type floppy disks were prepared from those magnetic films and are identified as Comparative Samples II-1 to II-4.

COMPARATIVE EXAMPLE II-5

By following the same procedure as in Example II-1, a magnetic layer was formed except that ferromagnetic particles in the coating composition for forming a magnetic layer as used in Example II-1 was changed to the following.

| Ferromagnetic particles: Co substituted Ba ferrite (specific surface area 35 m²/g, average particle diameter: 0.06 μm, tabular ratio: 3) |
|---|

A 3.5 inch type floppy disk was prepared from the magnetic film and was identified as Comparative Sample II-5.

COMPARATIVE EXAMPLE II-6

A magnetic layer was formed by following the same procedure as in Example II-1 except that ferromagnetic particles in the coating composition for forming a magnetic layer as used in Example II-1 was changed to the following.

| Ferromagnetic particles: Co substituted Ba ferrite (specific surface area: 80 m²/g, average particle diameter: 0.04 μm, tabular ratio: 6) |
|---|

A 3.5 inch type floppy disk was prepared from the magnetic film and was identified as Comparative Sample II-7.

COMPARATIVE EXAMPLE II-7

A magnetic layer was formed by following the same procedure as in Example II-1 except that ferromagnetic particles and binders used in the coating composition for forming a magnetic layer as used in Example II-1 were changed to the following.

| Ferromagnetic particles: the same as in Example II-4 Binder: |
|---|

| Copolymer of vinyl chloride and vinyl acetate (molecular weight: 30,000) | 30 parts |
|---|---|
| Polyurethane resin ("Crisvon 7209" a trade name, made by DAINIPPON INK AND CHEMICALS, LTD.) | 20 parts |
| Polyisocyanate | 25 parts |

A 3.5 inch type floppy disk was prepared from that magnetic film and was identified as Comparative Sample II-7.

COMPARATIVE EXAMPLE II-8

A magnetic layer was formed by following the same procedure as in Example II-1 except that ferromagnetic particles and binders in the coating composition for forming a magnetic layer as used in Example II-1 were changed to the following.

| Ferromagnetic particles: the same as in Example II-5 Binder: the same as in Comparative Example II-7 |
|---|

A 3.5 inch type floppy disk was prepared from that magnetic film. This was identified as Comparative Example II-8.

Each sample thus prepared in Examples and Comparative Examples was mounted on a floppy disk drive "JU-384" (a trade name, made by Matsushita Electric Industrial Co., Ltd.) and was allowed to stand under the thermocycle condition between at 5° C. and 10% RH and at 60° C. and 30% RH for 24 hours to conduct a running durability test.

The results thereof are shown in Table II-1 and in FIG. II-1. In Table II-1, initial 2F output (relative ratio: %) is a relative value when that of Sample II-1 is assumed to be 100%.

"Acid value" of binders was determined as follows.

Determination of "Acid Value"

1 g. of a sample was dissovled in tetrahydrofuran and was titrated with a potassium hydroxide aqueous solution of ethyl alcohol/water (95/5 by volume) using phenol phthalene as an indicator, and the value of mg of potassium hydroxide necessary for titration was identified as "acid value".

TABLE II-1

| Example and Comparative Example | Sample No. | Initial 2F output (relative ratio: %) | Running durability number of passes: × 10,000) Good: Number of passes is 35,000,000 or more |
|---|---|---|---|
| Example II-1 | Sample II-1 | 100 | 3500 (Good) |
| Example II-2 | Sample II-2 | 105 | 3500 (Good) |
| Example II-3 | Sample II-3 | 100 | 3500 (Good) |
| Example II-4 | Sample II-4 | 97 | 3500 (Good) |
| Example II-5 | Sample II-5 | 101 | 3500 (Good) |
| Comparative Example II-1 | Comparative Sample II-1 | 100 | 600 (Sticking occurred.) |
| Comparative Example II-2 | Comparative Sample II-2 | 70 | 3500 (Good) |
| Comparative Example II-3 | Comparative Sample II-3 | 100 | 900 (Wear-out occurred.) |
| Comparative Example II-4 | Comparative Sample II-4 | 60 | 3500 (Good) |
| Comparative Example II-5 | Comparative Sample II-5 | 80 | 3500 (Good) |
| Comparative Example II-6 | Comparative Sample II-6 | 102 | 2750 (Wear-out occurred.) |
| Comparative Example II-7 | Comparative Sample II-7 | — | 3000 (Wear-out occurred.) |
| Comparative Example II-8 | Comparative Sample II-8 | — | 2500 (Wear-out occurred.) |

As is apparent from the results of FIG. II-1, in Examples II-1 through II-5, samples of the present invention exhibited excellent results regarding both reproduced output and durability, however, when the specific surface area was 70 m²/g or more, the reproduced output was high, but durability deteriorated, and when it is less than 50 m²/g, durability was excellent but reproduced output was 90% or less, which is insufficient. The dotted line shows the case when a binder is a conventional thermosetting binder and such a binder exhibits poor durability as compared with the binder of this invention.

As shown in Table II-1, reproduced output is poor when the specific surface area is higher than the range was defined in this invention, and durability is poor when it is lower than the range as defined in this invention.

In accordance with this invention, a magnetic recording medium having excellent running durability and high output can be realized. Further, a magnetic layer of this invention is hardened by a compound polymerized by electron beam radiation, and therefore, the coating composition for forming a magnetic layer does not contain a hardening agent, and whereby, storage stability thereof become high. Accordingly, this invention is extremely excellent in various points.

While the invention has been described in detail and with reference to specific embodiments thereof, it will be apparent to one skilled in the art that various changes and modifications can be made therein without departing from the spirit and scope thereof.

What is claimed is:

1. A floppy disk type magnetic recording medium comprising a non-magnetic support having thereon a magnetic layer containing ferromagnetic particles which are dispersed in a binder and have a tabular hexagonal crystal shape having a tabular ratio of from 2 to 6 with an axis of easy magnetization perpendicular to the plate, wherein said ferromagnetic particles have a specific surface area of from 50 to less than 70 m²/g, and further said magnetic layer contains abrasive agents having a Mohs' hardness of 6 or more and having an average particle diameter of from 0.3 to 1.0 μm in an amount of from 7 to 15 parts by weight per 100 parts by weight of the ferromagnetic particles.

2. The magnetic recording medium as in claim 1 wherein a surface roughness (Ra) value of said magnetic layer shown by center line average roughness in a cut off value of 0.25 mm is from 0.01 to 0.03 μm.

3. The magnetic recording medium as in claim 1 wherein a compound which is polymerized with electron beam radiation is contained as a component in the binder.

4. The magnetic recording medium as in claim 1, wherein said ferromagnetic particles have a tabular diameter of from 0.01 to 0.10 μm.

5. The magnetic recording medium as in claim 1, wherein the average tabular thickness of said ferromagnetic particles is from 0.005 to 0.5 μm.

6. The magnetic recording medium as in claim 1, wherein said ferromagnetic particles have a tabular ratio of 2 or more.

7. The magnetic recording medium as in claim 1, wherein the specific surface area of said ferromagnetic particles is from 55 to 65 m²/g.

8. The magnetic recording medium as in claim 1, wherein said abrasive agents are chromium oxide or alumina.

9. The magnetic recording medium as in claim 1, wherein said abrasive agents have a Mohs' hardness of from 7 to 11.

10. The magnetic recording medium as in claim 1, wherein the average particle diameter of the abrasive agents is from 0.4 to 0.8 μm.

11. The magnetic recording medium as in claim 1, wherein said abrasive agents are contained in said magnetic layer in an amount of from 8 to 12 parts by weight per 100 parts by weight of the ferromagnetic particles.

12. The magnetic recording medium as in claim 1, wherein the ratio of ferromagnetic particles and binders is from 5 to 300 parts by weight of binders per 100 parts by weight of the ferromagnetic particles.

13. The magnetic recording medium as in claim 1, wherein said binder further include an electron beam polymerizable compound.

14. The magnetic recording medium as in claim 13, wherein a ratio of the electron beam polymerizable compound is 3 wt % or more per total components for the binder.

* * * * *